United States Patent
Chae

(10) Patent No.: US 11,349,538 B2
(45) Date of Patent: May 31, 2022

(54) METHOD FOR PERFORMING, BY TERMINAL, COMMUNICATION ACCORDING TO CYCLIC DELAY DIVERSITY (CDD) USING MULTIPLE ANTENNAS IN WIRELESS COMMUNICATION SYSTEM AND APPARATUS THEREFOR

(71) Applicant: LG Electronics Inc., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 16/603,210

(22) PCT Filed: Apr. 6, 2018

(86) PCT No.: PCT/KR2018/004082
§ 371 (c)(1),
(2) Date: Oct. 4, 2019

(87) PCT Pub. No.: WO2018/186711
PCT Pub. Date: Oct. 11, 2018

(65) Prior Publication Data
US 2021/0083736 A1    Mar. 18, 2021

Related U.S. Application Data

(60) Provisional application No. 62/586,881, filed on Nov. 15, 2017, provisional application No. 62/482,666, filed on Apr. 6, 2017.

(51) Int. Cl.
*H04B 7/06* (2006.01)

(52) U.S. Cl.
CPC .................. *H04B 7/0604* (2013.01)

(58) Field of Classification Search
CPC .................................................. H04B 7/0604
See application file for complete search history.

(56) References Cited

U.S. PATENT DOCUMENTS

| 2008/0132282 A1 | 6/2008 | Liu et al. |
| 2009/0080543 A1 | 3/2009 | Azizi et al. |

(Continued)

FOREIGN PATENT DOCUMENTS

| EP | 2448141 | 5/2012 |
| JP | 2007221746 | 8/2007 |

(Continued)

OTHER PUBLICATIONS

PCT International Search Report and Written Opinion in International Application No. PCT/KR2018/004082, dated Jul. 10, 2018, 22 pages (with English translation).

(Continued)

*Primary Examiner* — Sam K Ahn
*Assistant Examiner* — Amneet Singh
(74) *Attorney, Agent, or Firm* — Fish & Richardson P.C.

(57) ABSTRACT

Provided, according to various embodiments, are a method for performing, by a terminal, communication according to cyclic delay diversity (CDD) using multiple antennas in a wireless communication system and an apparatus therefor. Disclosed are a method for performing communication according to cyclic delay diversity (CDD) and an apparatus therefor, the method comprising the steps of: determining a delay range of a delay value for CDD on the basis of a moving speed of a terminal; determining the delay value of the CDD within a set delay range; and transmitting a cyclically delayed signal to a target terminal, according to the determined delay value, wherein the preset delay range is determined on the basis of the moving speed of the terminal.

9 Claims, 10 Drawing Sheets

(56) References Cited

U.S. PATENT DOCUMENTS

| | | |
|---|---|---|
| 2009/0275352 A1 | 11/2009 | Kim et al. |
| 2009/0300454 A1 | 12/2009 | Miyoshi et al. |
| 2012/0093258 A1* | 4/2012 | Suh .................. H04B 7/0623 |
| | | 375/295 |
| 2013/0294542 A1 | 11/2013 | Zhang et al. |
| 2015/0208390 A1* | 7/2015 | Zhao .................. H04W 72/042 |
| | | 370/330 |
| 2015/0210290 A1* | 7/2015 | Hemes ................ B60W 50/12 |
| | | 701/36 |
| 2016/0212596 A1 | 7/2016 | Brahmi et al. |
| 2017/0006404 A1* | 1/2017 | Hordys ............... H04W 84/18 |

FOREIGN PATENT DOCUMENTS

| | | |
|---|---|---|
| JP | 2009055607 | 3/2009 |
| JP | 2011521529 | 7/2011 |
| JP | 2012156828 | 8/2012 |
| JP | 2013013122 | 1/2013 |
| KR | 20100085401 | 7/2010 |
| KR | 20100138264 | 12/2010 |
| WO | WO2007083568 | 7/2007 |
| WO | WO2009008180 | 1/2009 |
| WO | WO2017030412 | 2/2017 |
| WO | WO2017049527 | 3/2017 |

OTHER PUBLICATIONS

Extended European Search Report in European Application No. 18780828.2, dated Nov. 2, 2020, 10 pages.

Fujitsu, "Discussion on Possible schemes in high Doppler case," R1-155160, 3GPP TSG RAN WG1 Meeting #82bis, Malmo, Sweden, dated Oct. 5-9, 2015, 3 pages.

JP Office Action in Japanese Appln. No. 2019-554975, dated Jan. 5, 2021, 6 pages (with English translation).

* cited by examiner

FIG. 5
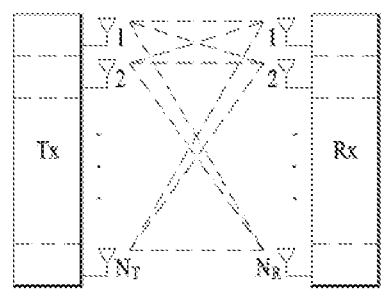
(a)
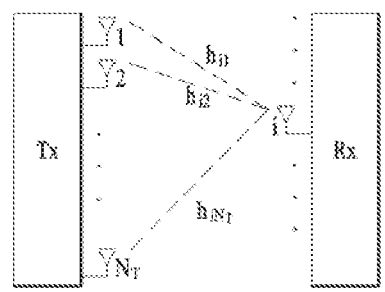
(b)

METHOD FOR PERFORMING, BY TERMINAL, COMMUNICATION ACCORDING TO CYCLIC DELAY DIVERSITY (CDD) USING MULTIPLE ANTENNAS IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/004082, filed on Apr. 6, 2018, which claims the benefit of U.S. Provisional Application No. 62/482,666, filed on Apr. 6, 2017 and U.S. Provisional Application No. 62/586,881, filed on Nov. 15, 2017. The disclosures of the prior applications are incorporated by reference in their entirety.

TECHNICAL FIELD

The present specification relates to a wireless communication system, and more particularly, to a method of performing communication by a user equipment according to Cyclic Delay Diversity (CDD) using multiple antennas and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

One technical task of the present invention is to enable a User Equipment (UE) to change a diversity gain according to CDD to correspond to a change of a channel state by determining a delay value for the CDD based on at least one of a speed and a transmission parameter.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present specification, provided herein is a method of performing communication according to Cyclic Delay Diversity (CDD) by a user equipment using a multi-antenna in a wireless communication system, the method including determining a delay range of a delay value for the CDD based on a moving speed of the user equipment, determining the delay value for the CDD within the delay range, and transmitting a signal cyclically delayed according to the determined delay value to a target user equipment.

According to one example, the delay value is determined based on a relative speed to the target user equipment.

The delay value is determined with the preset delay range based on a delay spread with the target user equipment.

The relative speed is determined by considering at least one of a Cooperative Awareness Message (CAM) and a Basic Safety Message (BSM) received from the target user equipment.

The delay value is determined based on a relative speed between the user equipment and the target user equipment when the user equipment is located in a preset distance or longer from the target user equipment.

If an RSRP of a signal received from the target user equipment is equal to or greater than a preset reference value, the delay value is determined based on a relative speed between the user equipment and the target user equipment.

The delay value is randomly selected within the preset delay range in each one of a symbol, subframe and MAC PDU of the signal.

If receiving a request for a retransmission of the signal, the user equipment increases the delay value within the preset delay range.

If receiving a request for a retransmission of the signal, the user equipment decreases the delay value within the preset delay range.

The delay value is determined based on a bandwidth of a channel having the signal transmitted therethrough.

The delay value is determined based on a distance from the target user equipment.

The delay value is determined differently per antenna of the multi-antenna.

The delay value is determined in a manner that a difference of a delay value between adjacent antennas of the multi-antenna is greater than a difference between non-adjacent antennas of the multi-antenna.

And, the delay value is determined as a different value depending on presence or non-presence of Line-Of-Sight (LOS) of a channel having the signal transmitted therethrough. Or, According to an embodiment of the present disclosure, the processor is configured to receive a user input to switch the drive mode from an autonomous mode to a manual mode, or to switch from a manual mode to an autonomous mode.

Advantageous Effects

A method of performing communication by a user equipment according to Cyclic Delay Diversity (CDD) using multiple antennas and apparatus therefor can change a diversity gain of CDD appropriately to correspond to a change of a channel state by determining a delay value for the CDD based on at least one of a speed and a transmission parameter.

Effects obtainable from the present invention are non-limited by the above-mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

The accompanying drawings, which are included to provide a further understanding of the disclosure and are incorporated in and constitute a part of this application, illustrate embodiments of the disclosure and together with the description serve to explain the principle of the disclosure.

FIG. 5 is a view illustrating the configuration of a wireless communication system having multiple antennas;

BEST MODE FOR INVENTION

Figure 1:
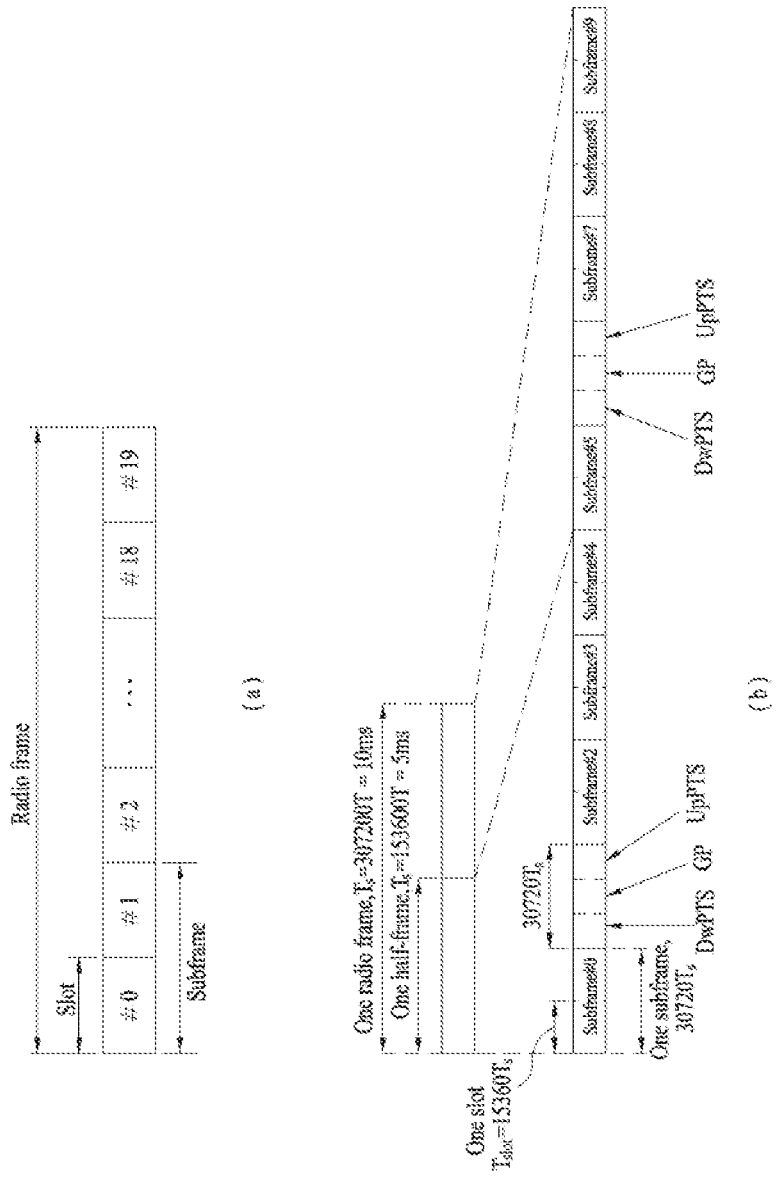
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE).

OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
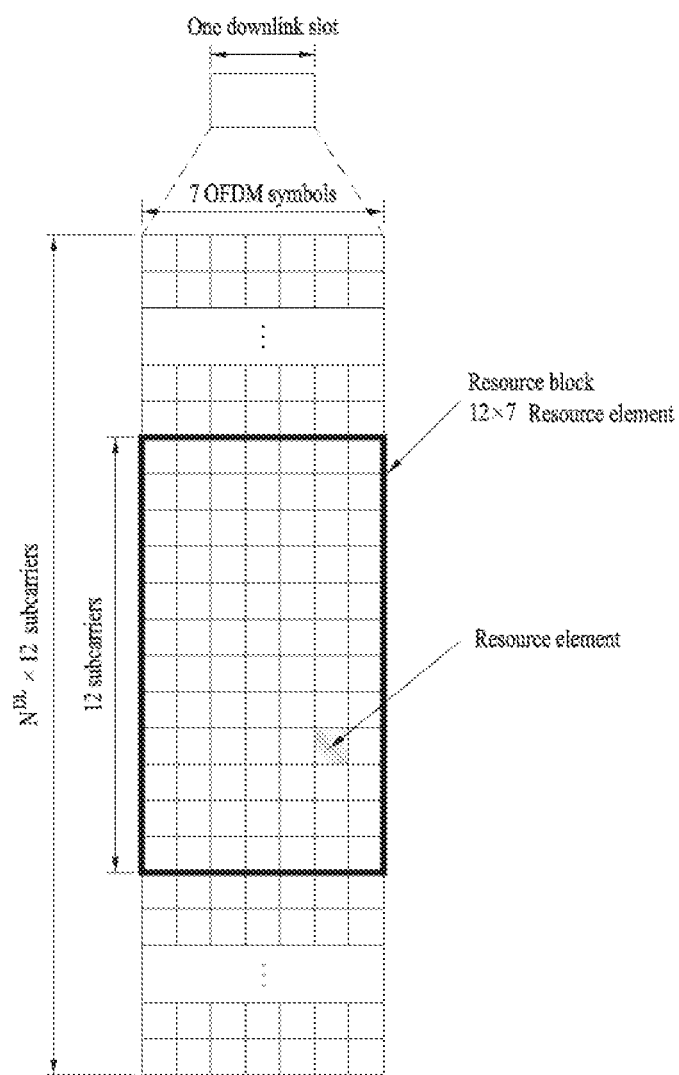
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
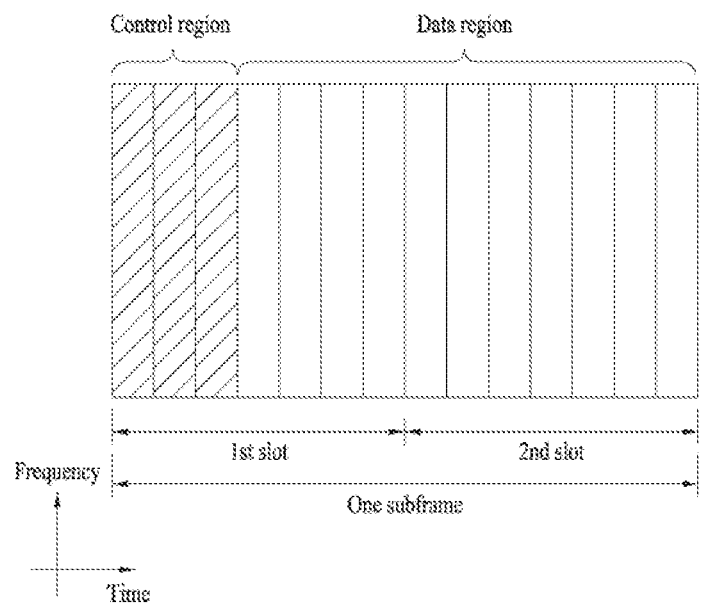
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
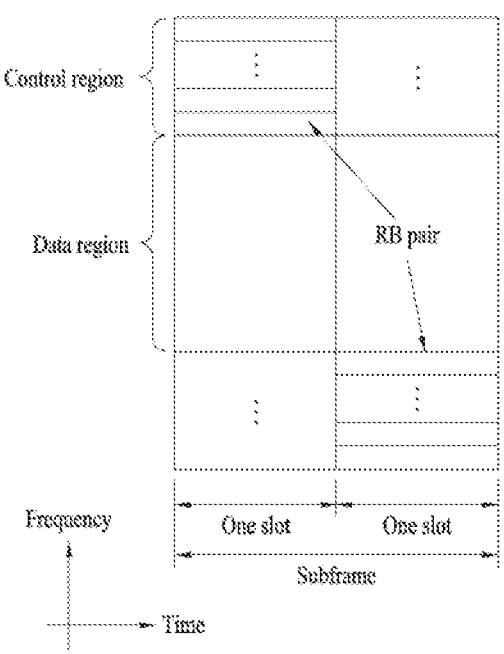
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
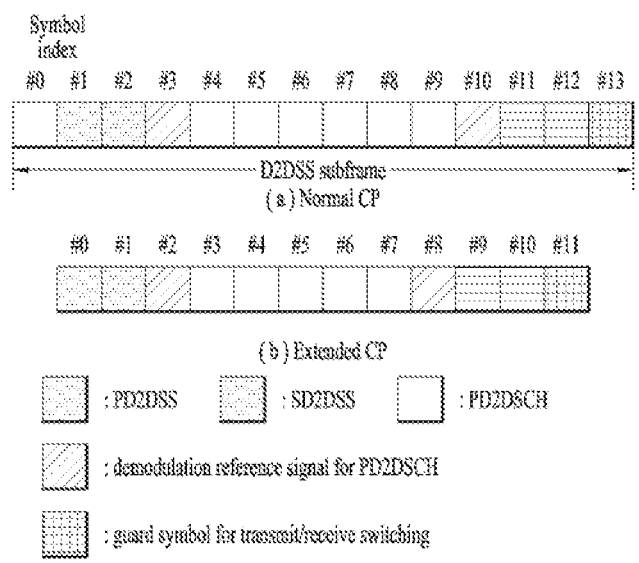
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
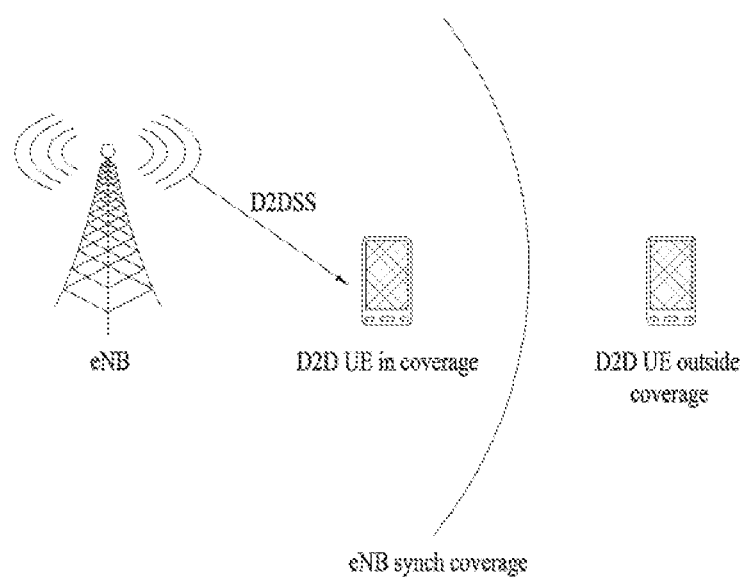
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
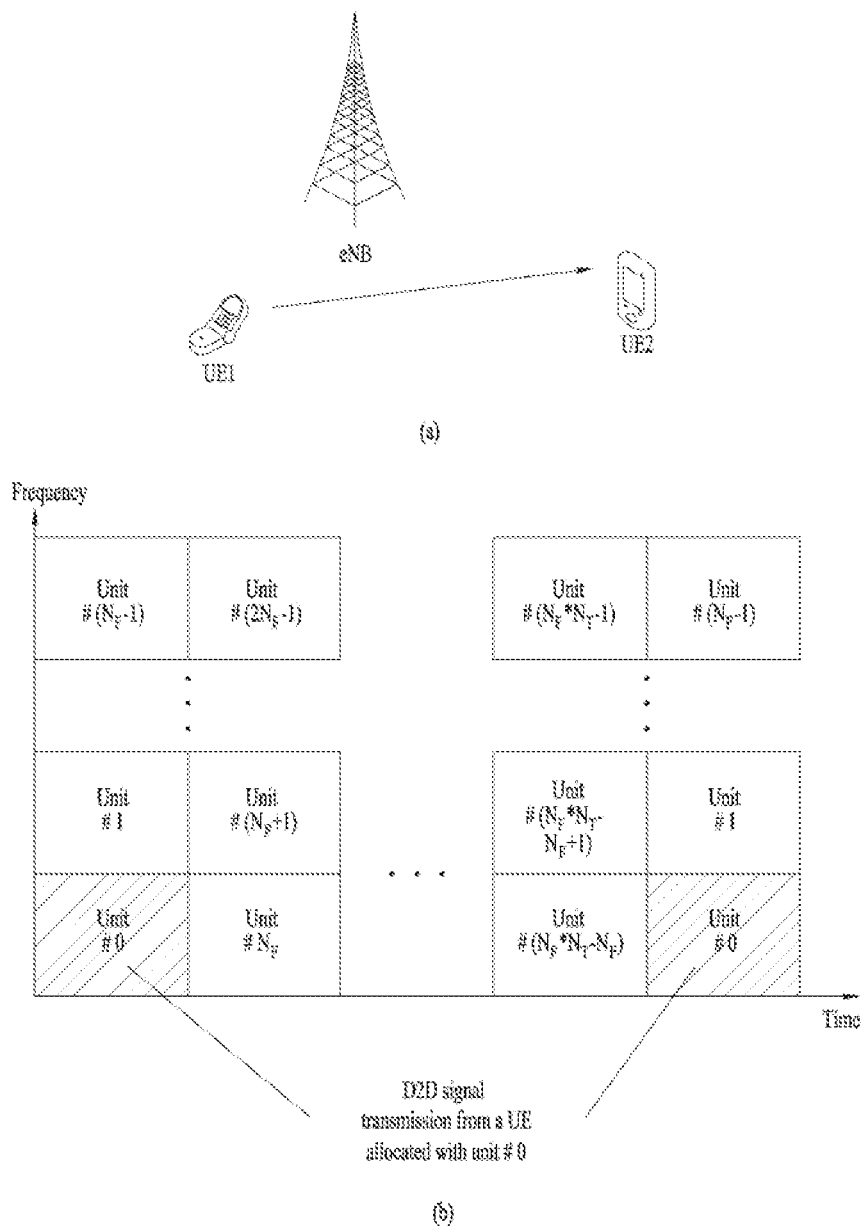
FIG. 8 is a view illustrating an exemplary D2D resource pool for D2D.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
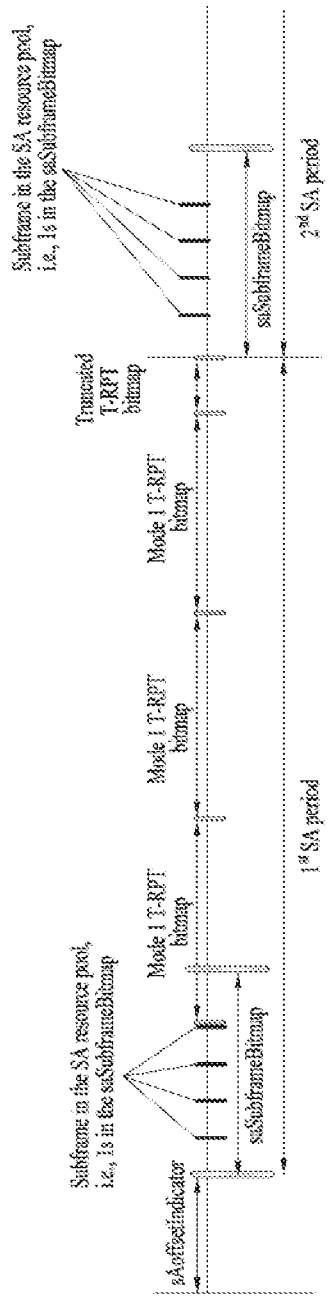
FIG. 9 is a view illustrating a scheduling assignment (SA) period

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Figure 10:
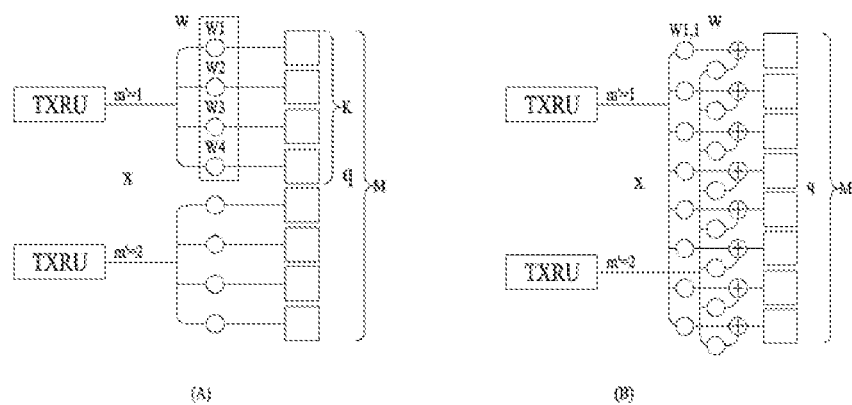
FIG. 10 illustrates examples of a connection scheme between TXRUs and antenna elements.

FIG. 10 illustrates examples of a connection scheme between TXRUs and antenna elements.

FIG. 10 (a) illustrates that TXRU is connected to a sub-array. In this case, the antenna elements are connected to only one TXRU. Unlike FIG. 10 (a), FIG. 10 (b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
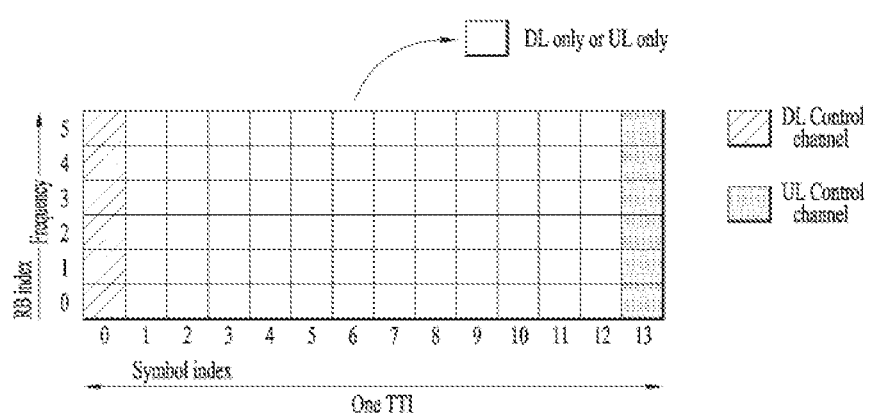
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period In 5G NewRAT, a signal transmissions scheme may differ according to services or requirements. For example, a transmission time unit of enhanced mobile broadband (eMBB) may be relatively long and a transmission time unit of ultra-reliable and low latency communication (URLLC) may be relatively short.

According to a service type, particularly, in the case of an urgent service, a URLLC signal may be transmitted on a corresponding resource even in the middle of eMBB transmission. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G NewRAT may consider performing retransmission in a CB unit, rather than in a transport block (TB) unit.

Beamforming on mmW

Meanwhile, in the Millimeter Wave (mmW), since a wavelength is short, a plurality of antennas can be installed in the same area. That is, considering that the wavelength in the 30 GHz band is 1 cm, a total of 64 (8×8) antenna elements can be installed in a 4-by-4 cm panel at intervals of 0.5 lambda (wavelength) in the case of a 2-dimensional array. Therefore, in the recent trend of the mmW field, it is attempted to improve the coverage or throughput by increasing the beamforming (BF) gain using multiple antenna elements.

In this case, if each antenna element includes a Transceiver Unit (TXRU) to enable adjustment of transmit power and phase per antenna element, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beaming is impossible because only one beam direction is generated over the full band.

As an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Channel Dependent Cyclic Delay Diversity

Cyclic Delay Diversity is a method of transmitting a symbol transmitted per antenna by delaying it for a predetermined time in a multi-antenna system (meanwhile, a delay value per antenna may be different). The delay in a frequency domain is linear phase rotation, thereby bringing an effect that a beam per frequency resource is cycled.

For example, if a transmission is configured to be made without a delay at a first antenna and a delay amounting to a prescribed delay value (or theta) is configured at a second antenna, a phase rotation according to the following formula occurs on an $i^{th}$ subcarrier.

$$e^{j \cdot \frac{2\pi\theta}{N_{FFT}i}},$$

where $N_{FFT}$ is the FFT point number

Namely, as a beam direction is changed per Resource Element (RE), beam cycling per RE may be regarded as occurring in frequency domain. In this case, a diversity gain of CDD may be changed depending on how a per-antenna delay value (or theta) is set. A method of determining a delay value (or theta) according to a transmission parameter is described as follows.

According to one embodiment, a delay value (or theta) may be set different based on a bandwidth of transmission of data. For example, since a channel in frequency domain is highly possible to be flat in narrow band transmission, a large delay value (or theta) may be usable to change a channel more quickly. On the contrary, since a channel is highly possible to be selective already in transmission of wide bandwidth, a delay value (or theta) uses a small value so that a channel may be changed relatively slowly in frequency domain. In this case, performance of channel estimation can be improved.

Here, a difference of transmission bandwidth may include a difference of a transmitted physical layer channel. For example, if a transmission bandwidth of a control channel and a transmission bandwidth of a data channel are 2 RB and 10 RB, respectively, a delay value (or theta) of the data channel may be set to a value different from that of the control channel.

Or, a delay value (or theta) may be set for a specific physical channel in advance. For example, since a transmission bandwidth of a control channel is fixed and demodulation should be performed without other information in advance, a delay value (or theta) may be fixed in this case. So to speak, a delay value (or theta) is fixed to a preset value for a control channel and may have a different value for a data channel according to a transmission bandwidth.

Or, a delay value (or theta) per antenna port used for data transmission and/or the number of antenna ports may be signaled to a Receiving User Equipment (Rx UE) through physical or higher layer signaling of a User Equipment (UE). In case that a Base Station (BS) signals a delay value (or theta) per antenna port and/or the number of antenna ports in this ways, the BS may signal such information to the UE through physical or higher layer signaling.

Or, in case that several physical channels need to be simultaneously transmitted within the same Transmission Time Interval (TTI), a delay value (or theta) may be determined using a maximum or minimum value among per-channel delay values (or theta) or a weighted average value. Namely, if a delay value (or theta) is determined as one of a maximum or minimum value among per-channel delay values (or theta) and a weight-applied average value, each per-channel delay value may be different owing to the application of a time delay in time domain. In this case, it is able to prevent the increase of UE's complexity according to the implantation of separate Inverse Fast Fourier Transform (IFFT) for each channel.

According to one embodiment, a delay value (or theta) may be determined different depending on a presence or non-presence of Line-OF-Sight (LOS) and Non-Line-Of-Sight (NLOS) of a channel. A Transmitting User Equipment (Tx UE) may differently determine delay value (or theta) used when LOS or NLOS. A delay value (or theta) according to situation may include a predetermined value or a value indicated to a UE by a network through physical or higher layer signaling.

Meanwhile, in case of LOS, the application of CDD may degrade performance in comparison with a case of not applying CDD due to a specific subcarrier falling into deep fading. Hence, in case of a LOS channel, CDD may not be used. For example, when a time domain response of a channel is h(t)=1, a frequency domain gain response) may be represented as the following equation.

$$|H(i)|^2 = 1 + \cos(2\pi\theta i/N_{FFT})$$

In this case, on a specific subcarrier, a value of $|H(i)|^2$ may become 0.

Therefore, in LOS, using CDD may degrade performance instead. Considering such matter, a delay value (or theta) in LOS may be 0 (CDD not applied).

Meanwhile, a presence or non-presence of LOS/NLOS of a channel may be obtained by a Tx UE through channel reciprocity or in a manner that an Rx UE informs the Tx UE of the presence or non-presence of LOS/NLOS through physical or higher layer signaling.

According to one embodiment, a delay value (or theta) may be determined by being linked to a delay spread. Here, the delay spread may include the definition of an effect of a time delay or mergence between a first received radio wave and a next-reflected received radio wave, which pass different paths in a multipath environment of radio waves. For example, a Tx UE may measure a delay spread from other UEs or receive the delivery of information on a delay spread signaled from another UE. Or, if a value of a delay spread between UEs is signaled by a network (or BS), a delay value (or theta) may be determined based on a delay spread.

Such a scheme may be applicable by being limited to a small delay CDD. Since a large delay CDD is to apply a delay over a CP length in OFDM, it is applicable irrespective of a delay spread based selection. Hence, a delay value (or theta), which is used in case that a delay spread is equal to or greater than a predetermined threshold (e.g., a CP length), and a delay value (or theta), which is used in case that a delay spread is smaller than the predetermined threshold, may be determined in a manner of being different from each other. So to speak, if a delay spread is smaller than a predetermined threshold (e.g., a CP length), a delay value can be determined based on the delay spread. If a delay spread is equal to or greater than the predetermined threshold (e.g., a CP length), a delay value may be determined without depending on the delay spread.

Or, a delay value (or theta) may be determined by being linked according to a target range. According to a target range, a probability that a channel is LOS may be different from a probability that a channel is NLOS or an average delay spread may be different. Hence, by considering such matter, a presence or non-presence of application of CDD (or a delay value) may vary according to a distance from a target UE that targets a specific message.

According to one embodiment, a delay value (or theta) may be randomly selected per OFDM symbol, OFDM symbol group, subframe or MAC Protocol Data Unit (PDU) transmission. In this case, a maximum value of a delay may be set according to implementation of a UE or determined by a maximum, minimum or average delay spread measured by a UE. Or, a maxim value of a delay may be determined within a range signaled by a network (or BS). According to this method, an optimal delay value may differ by a change of a channel or per Rx UE. This is to prevent decoding from failing consecutively by a specific UE at specific timing during transmission by randomly selecting the delay value (or theta).

In this case, a changing order of the delay value (or theta) may be random or determined in advance. For example, a UE performs transmission by setting a delay value (or theta) to a small value. In doing so, the UE may apply a large value to the delay value (or theta) each time retransmission occurs. Or, a UE performs transmission by setting a delay value (or theta) to a low value. In doing so, the UE may change the delay value (or theta) into a smaller value each time retransmission occurs.

Or, a delay value (or theta) may be set different per OFDM symbol/OFDM symbol group. In this case, a minimum unit for a delay value (or theta) to change may be a range for applying channel estimation of the same RS symbol. For example, in case of using a single DeModulation Reference Signal (DMRS) port in a single slot (e.g., 7 symbols) or subframe, a delay value (or theta) does not change during the 7 symbols or the subframe. Namely, in order to correctly estimate a channel in data symbol, the data symbol has the same delay value (or theta) as a Reference Signal (RS) transmitted symbol.

Or, in case that a delay value (or theta) is determined within a range set by a network (or BS), a UE may vary a usable range of the delay value (or theta) according to a moving speed of the UE. For example, a delay value range used by a UE currently moving within a predetermined speed region may be set different from a delay value range used by a UE currently moving in another predetermined speed region. To this end, the network (or BS) may set a per-speed range delay value (or theta) or a delay value range through physical or higher layer signaling. Such a parameter may be determined in advance for a UE out of coverage of the network (or BS).

For example, as a UE moves fast, if the UE already obtains sufficient diversity according to the movement of the UE, the UE may use a small delay value (or theta) or a delay value of 0 for the performance improvement of channel estimation. In case that a UE moves slow, the UE may use a large delay value (or theta) to obtain additional diversity in frequency domain.

Meanwhile, although a delay value (or theta) may be determined according to a moving speed of a UE, the UE may measure a maximum/minimum/average relative speed between UEs through Cooperative Awareness Messages/Basic Safety Messages (CAM/BSM) received by the UE and then set a delay value (or theta) or a usable delay value (or theta) range different according to a result of the measurement. In this case, since a change of a channel will change according to a relative speed of the UE, the UE can reflect a state of the channel more accurately. To this end, information such as a delay value (or theta) according to a maximum/minimum/average relative speed of the UE, a range of the delay value (or theta) and the like can be signaled to the UE by a network (or BS) through physical layer or higher layer signaling.

Particularly, a UE may determine a delay value (or theta) by considering a channel status with a specific counterpart UE. For example, a UE may determine a delay value (or theta) by considering a relative speed to a UE located in a predetermined distance or longer. To this end, the UE may set the delay value (or theta) by considering a relative speed between UEs if a Reference Signal Received Power (RSRP) of a signal received from the specific UE is smaller than (or equal to or greater than) a predetermined threshold. This is to maximize diversity by targeting a UE located in a specific distance or longer since the UE located in the specific distance or longer may have a relatively poor packet reception rate. In this case, the UE may determine a delay value (or theta) by considering an average/maximum/minimum delay spread or a relative speed of the specific counterpart UE or UE group.

According to one embodiment, when a multitude of antennas exist, if the antennas get closer (e.g., higher correlation) to each other, a larger delay value (or theta) difference may be set. For example, when delay values applied per antenna in a 4-antenna system are represented as [theta 1, theta 2, theta 3, theta 4], a difference between theta 1 and theta 2 is set greater than a difference between theta 1 and theta 3. For example, when theta 1=0, theta 2 may be set to 180° (=pi), theta 3 may be set to 90° (=pi/2), and theta 4 may be set to 270° (=3*pi/2). This scheme is to make a channel of a different type possible between antennas located adjacent to each other.

Or, a different CDD scheme is applicable per antenna group. For example, when 4 antennas exist, small delay CDD is used for antenna 1 and antenna 2 and large delay CDD is usable between antennas 1 and 2 and antennas 3 and 4. Namely, in case that 4 antennas exist, CDDs of different types such as theta 1=0, theta 2=2 μs, theta 3=70/2 μs, theta 4=70/2+2 μs (here, one OFDM symbol length is assumed as 70 μs) are applicable. In this case, a UE can acquire both advantages of small delay CDD and large delay CDD.

Regarding large delay CDD, only if a separate Reference Signal (RS) port is allocated, an Rx UE can receive a signal correctly. For example, when CDD is applied at 2 antennas, small delay CDD enables an RX UE to perform correct reception using a single DeModulation Reference Signal (DMRS) port. On the contrary, large delay CDD enables an Rx UE to perform correct reception only if transmission is performed using two DMRS ports. Yet, in case that an Rx UE is performing a blind search for a large delay, although a separate port is not allocated, the Rx UE may perform channel estimation using a single DMRS port only. For example, in case that a delay amounting to a delay value (here, the delay value is equal to or greater than a CP length) is performed at a second antenna, the Rx UE can perform the blind search for the theta. In this case, the Rx UE will find a maximum peak from the theta 0 and the delay value. Here, if a channel estimated from each delay is combined, the Rx UE (or receiver) may estimate a synthesized channel without separate DMRS port allocation.

Therefore, it is able to consider a method of configuring a DMRS port for CDD differently according to an operation of an Rx UE (or receiver). Only if an Rx UE (or receiver) uses a theta by exceeding a delay range for a blind search, an additional DMRS port can be allocated. For example, small delay CDD may be regarded as an Rx UE blind-searches for a delay within a CP length. In this regard, in case that small delay CDD is applied only, one DMRS port can be allocated only. On the other hand, if a theta is equal to or greater than a CP length and an Rx UE does not perform a delay search over a CP length, a Tx UE should allocate an additional DMRS port. Although it is a case of large delay CDD, an Rx UE may perform a delay search as much as a large delay value. In this case, the Rx UE can operate using a single DMRS port.

All or some of the proposed embodiments may be applicable to at least one of a control signal and a data signal. Or, an individual scheme may be applicable to each of a control signal and a data signal. Meanwhile, the contents of the present invention are non-limited to UE-to-UE direct communication only but are usable for uplink or downlink. In this case, a BS, a relay node or the like may use the proposed method. As examples of the above-described proposed schemes can be included as one of the implementing methods of the present invention, they can be apparently regarded as a sort of proposed schemes. Moreover, although the above-described proposed schemes can be independently implemented, they may be implemented in combined (or merged) form of some of the proposed schemes. Information on a presence or non-presence of application of the proposed methods (or information on rules of the proposed methods) may be defined to be notified to a UE by a BS through predefined signaling (e.g., physical layer signaling or higher layer signaling).

Figure 12:
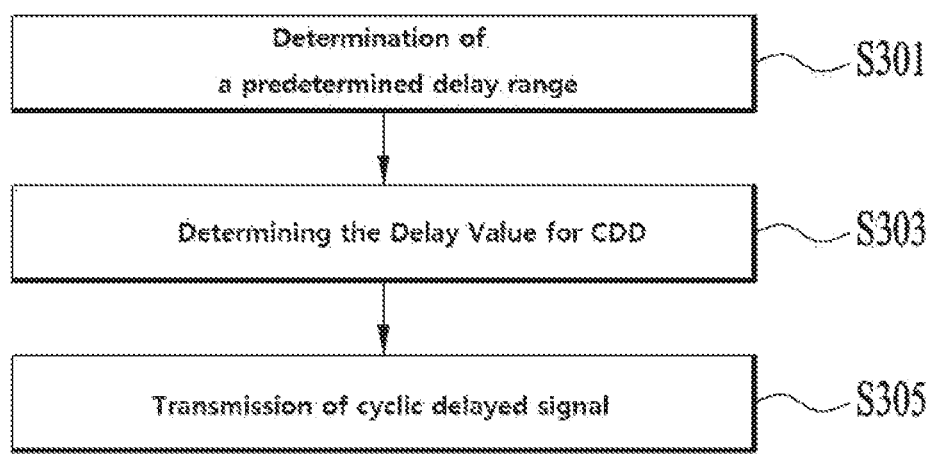
FIG. 12 is a flowchart to describe a method of determining a delay value to apply CDD according to an embodiment of the present invention.

FIG. 12 is a flowchart to describe a method of determining a delay value to apply CDD according to an embodiment of the present invention.

Referring to FIG. 12, a UE may determine a preset delay range corresponding to a speed range to which a moving speed of the UE belongs. Here, the preset range is preset differently per speed range. For example, if a moving speed is in a range between 30~40 km/h, it is set to a first delay range. If a moving speed is in a range between 40~50 km/h, it can be set to a second delay range different from the first delay range. Such information may be forwarded in advance from a BS through physical or higher layer signaling [S301]. In the above method, the UE may determine a delay range based on a moving speed of its own. Instead, the UE may determine a delay range based on a minimum/average/maximum relative speed to another UE.

The UE determines a prescribed value in the determined preset delay range as a delay value and may then transmit a signal, which is cyclically delayed by applying CDD according to the determined delay value, to a target UE. In this case, the UE may determine the delay value by considering a channel state and the like. Here, the channel state means a bandwidth of a channel through which the signal is transmitted, presence or non-presence of straightness (LOS/NLOS), delay spread, target range (e.g., distance from a target UE), moving speed, relative speed, Doppler shift according to speed, Doppler spread, etc. [S303].

The UE may transmit the signal, which is cyclically delayed by applying the determined delay value per antenna, to the target UE. For example, when the multi-antenna includes 4 antennas and the determined delay value is 90°, the delay value (i.e., 0°) applied signal, the delay value (i.e., 90°) applied signal, the delay value (i.e., 180°) applied signal and the delay value (i.e., 270°) applied signal can be transmitted to the target UE through first to fourth antennas, respectively [S305].

According to one embodiment, a UE may determine a delay value within the preset delay range according to a bandwidth of a channel. Information on the delay value corresponding to per bandwidth of the channel may be preset by considering channel change information according to the bandwidth of the channel. For example, as a bandwidth of a channel is narrower than a specific reference width, if the channel is flat, the UE can set a delay value to a large value to give a change to the channel (i.e., diversity increase of the channel). On the contrary, if a bandwidth of a channel is wider than the specific reference width, as sufficient channel diversity is secured already, the UE can set the delay value to be low to improve performance of channel estimation. Namely, the delay value may be preset to a different value according to the bandwidth of the channel by considering selective possibility according to the bandwidth of the channel.

Or, the UE may set the delay value different according to presence or non-presence of straightness (LOS) of a channel. If determining that the straightness (LOS) of the channel is secured, the UE may not use CDD to prevent a specific subcarrier from falling into deep fading or determine the delay value as a very small value. On the contrary, if the straightness of the channel is not secured [NLOS], the UE may determine a prescribed value in the preset delay range as a delay value. Namely, the UE may determine a delay value differently depending on whether a channel is NLOS or LOS.

Or, the UE may determine the delay value based on a delay spread of a channel. To this end, the UE may directly measure a delay spread with the target UE or be provided with information on a delay spread measured by the target UE. The UE may secure sufficient diversity by setting the delay value differently based on the measured delay spread. Meanwhile, the UE stores information on a corresponding delay value per the delay spread in advance and may determine a delay value corresponding to a delay spread measured on the basis of the stored information.

Or, the UE may determine the delay value by considering a target range. Here, the target range may be determined based on a distance between the UE and the target UE. For example, the UE may determine the delay value differently depending on whether the target range is smaller than a preset threshold. Meanwhile, information on a corresponding delay value per the target range may be preset. Considering a fact that a probability that a channel is LOS is changed according to a distance from the target UE and a fact that an average delay spread is changed according to the distance, a delay value according to the target range may be preset. Based on the preset information, the UE may determine a delay value corresponding to the target range.

According to one embodiment, the UE may determine at least one of the delay value and the preset delay range based on a relative speed to the target UE. To this end, the UE may detect a relative speed to the target UE based on a received CAM/BSM message of the target UE. For example, the CAM/BSM message may include moving speed information on the target UE, and the UE may detect a relative speed by finding a difference between a moving speed of the target UE, which is included in the CAM/BSM message, and a moving speed of the UE. In this case, the UE may determine a preset delay range based on the detected relative speed. Or, the UE may determine a corresponding delay range with reference to minimum, maximum and average values of the detected relative speed. Meanwhile, as described above, the UE may receive information on a preset delay range different per range of the relative speed from the BS in advance and then store the received information.

Or, the UE may accumulate information on the detected relative speed for a predetermined time and determine a speed of at least one of minimum, maximum and average values as a reference speed based on the accumulated information of the relative speed. The UE may determine a delay range based on the reference speed and determine a value corresponding to a relative speed (or the reference speed) detected within the determined delay range as a delay value.

Meanwhile, the information on the preset delay range and the delay value per the relative speed (or reference speed) may be signaled to the UE in advance through physical or higher layer signaling.

According to one embodiment, when transmitting a signal for a target UE located in a predetermined distance or longer, the UE may determine a delay value for CDD application. In doing so, the UE may detect the relative speed and determine a delay value for the CDD application based on the detected relative speed. Namely, the UE may maximize diversity by selectively applying CDD to a signal to transmit to the target UE. In this case, a signal reception rate (or a packet reception rate) of the target UE in a predetermined distance or longer can be prevented from being lowered relatively.

Or, if an RSRP of a signal received from the target UE is smaller than a preset threshold, the UE may determine the delay value by considering a relative speed to the target UE and then transmit a signal, to which CDD according to the delay value is applied, to the target UE.

According to one embodiment, the UE may randomly select the delay value within the predetermined delay range. This is to prevent decoding of the signal of the target UE from failing consecutively at a specific timing as an optimal delay value varies due to a change of a channel. Namely, the UE randomly selects the delay value within the predetermined delay range, thereby preventing the consecutive decoding failure of the Target UE on the signal. Particularly, the UE may randomly select the delay value within the preset delay range in each one of a symbol unit, a subframe unit and a MAC PDU unit of the signal.

Figure 13:
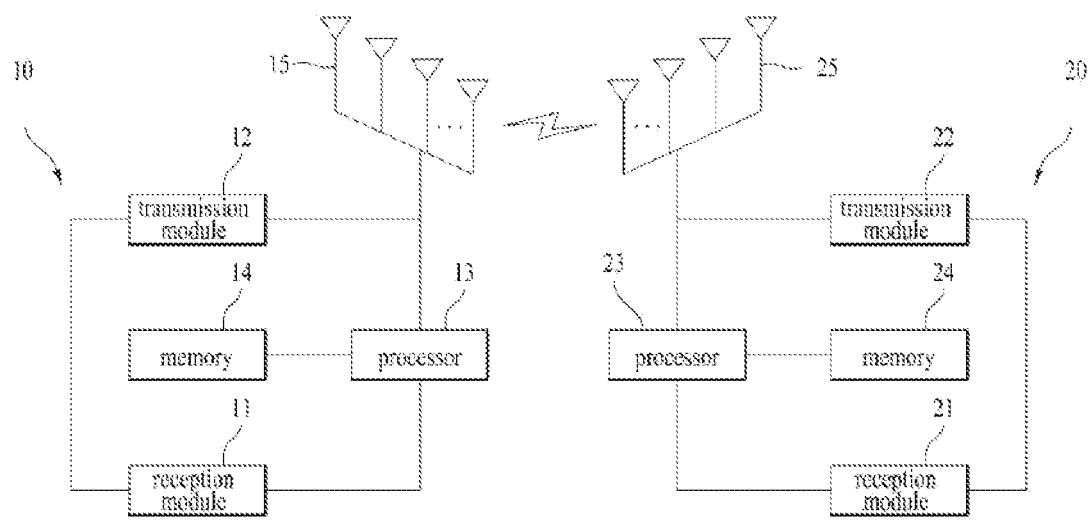
FIG. 13 is a diagram schematically showing a User Equipment (UE) performing D2D communication.

FIG. 13 is a diagram schematically showing a User Equipment (UE) performing D2D communication.

With continued reference to FIG. 13, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. Or/and receiver 21 may transmit a D2D signal (sidelink signal) to the other UE. The transmitter 22 may transmit various UL signals, data, and information to an eNB. Or/and transmitter 22 may transmit a D2D signal (sidelink signal) to the other terminal. The processor 23 may provide overall control to the UE 20.

The processor 23 of the UE 20 according to an embodiment of the present invention can process the necessary items in each of the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown)

The specific configuration of the transmission point apparatus and the UE may be implemented such that the details described in the various embodiments of the present invention may be applied independently or implemented such that two or more of the embodiments are applied at the same time. For clarity, redundant description is omitted In the example of FIG. 13, the description of the transmission point apparatus 10 may also be applied to a relay device as a downlink transmission entity or an uplink reception entity, and the description of the UE 20 may also be applied to a relay device as a downlink reception entity or an uplink transmission entity The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of performing communication according to Cyclic Delay Diversity (CDD) by a user equipment (UE) using a plurality of antenna in a wireless communication system, the method comprising:
   applying a delay value for the CDD to the plurality of antennas; and
   transmitting a signal to a target UE using the plurality of antennas to which the delay value is applied,
   wherein the UE is configured to determine, based on the delay value that is a large delay value greater than or equal to a cyclic prefix (CP) length, a number of demodulation reference signal (DMRS) ports to be used for the transmission of the signal,
   wherein, based on a blind search being performed for the large delay value in the target UE, the number of DMRS ports is determined as a predetermined number of DMRS ports, and
   wherein, based on the blind search not being performed for the large delay value in the target UE, the number of DMRS ports is determined to be a value greater than the predetermined number of DMRS ports.

2. The method of claim 1, wherein, based on the blind search being performed for the large delay value in the target UE, the number of DMRS ports is determined as one, and wherein, based on the blind search not being performed for the large delay value in the target UE, the number of DMRS ports is determined as two.

3. The method of claim 1, wherein the CDD includes (i) a large delay CDD to which the large delay value greater than the CP length is applied and (ii) a small delay CDD to which a small delay value less than the CP length is applied.

4. The method of claim 3, wherein, based on the plurality of antennas being grouped into a plurality of antenna groups, the UE is configured to apply (i) the small delay CDD between antennas included in each of the plurality of antenna groups and (ii) the large delay CDD between the plurality of antenna groups.

5. The method of claim 1, wherein, based on the plurality of antennas being grouped into a plurality of antenna groups, the delay value applied between antennas included in each of the plurality of antenna groups is different from the delay value applied between the plurality of antenna groups.

6. The method of claim 1, wherein the delay value is determined based on relative speed between the UE and the target UE in response to the UE being located a preset distance or farther from the target UE.

7. The method of claim 1, wherein, based on reference signal received power (RSRP) of a signal received from the target UE being equal to or greater than a preset reference value, the delay value is determined based on relative speed between the UE and the target UE.

8. A user equipment (UE) performing communication according to Cyclic Delay Diversity (CDD) using a plurality of antennas in a wireless communication system, the UE comprising:
   a transceiver including the plurality of antennas; and
   a processor configured to:
      apply a delay value for the CDD to the plurality of antennas, and
      transmit a signal to a target UE using the plurality of antennas to which the delay value is applied,
   wherein the processor is further configured to determine, based on the delay value that is a large delay value greater than or equal to a cyclic prefix (CP) length, a number of demodulation reference signal (DMRS) ports to be used for the transmission of the signal,
   wherein, based on a blind search being performed for the large delay value in the target UE, the number of DMRS ports is determined as a predetermined number of DMRS ports, and
   wherein, based on the blind search not being performed for the large delay value in the target UE, the number of DMRS ports is determined to be a value greater than the predetermined number of DMRS ports.

9. The UE of claim 8, wherein, based on the blind search being performed for the large delay value in the target UE, the number of DMRS ports is determined as one, and
   wherein, based on the blind search not being performed for the large delay value in the target UE, the number of DMRS ports is determined as two.

* * * * *